July 28, 1953   F. SALDITT   2,646,771
APPARATUS FOR MAKING ADHESIVE TAPE
Filed April 27, 1950
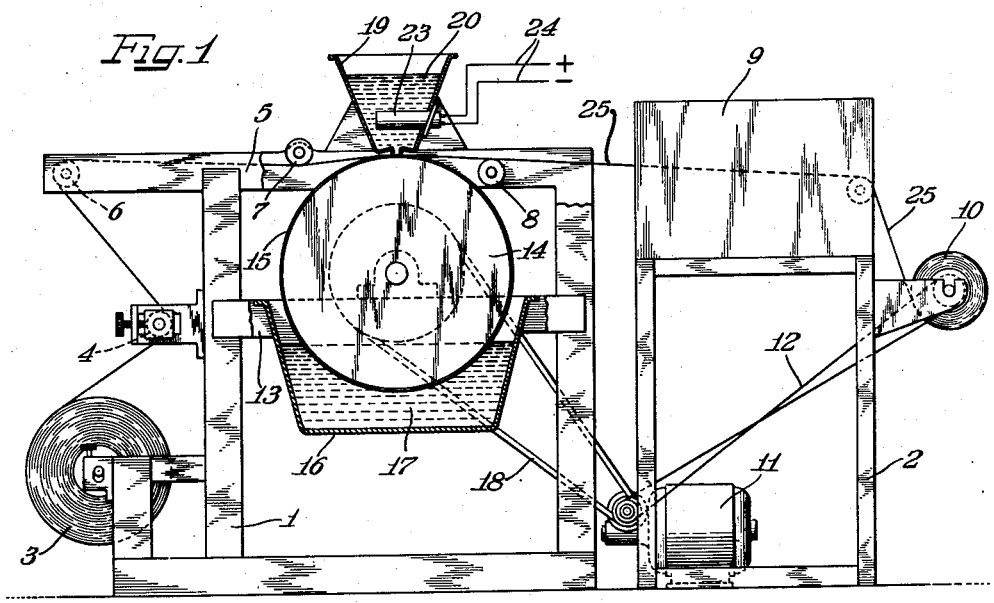
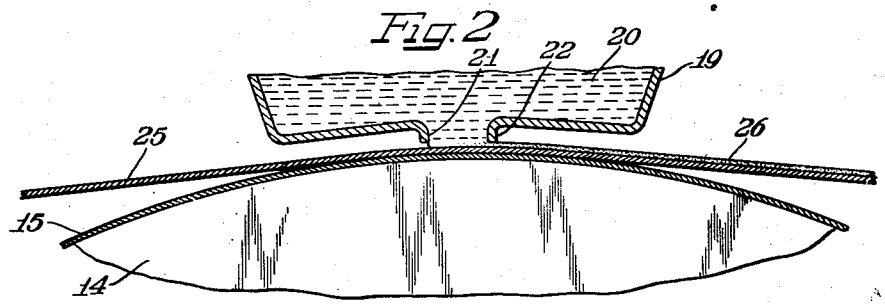
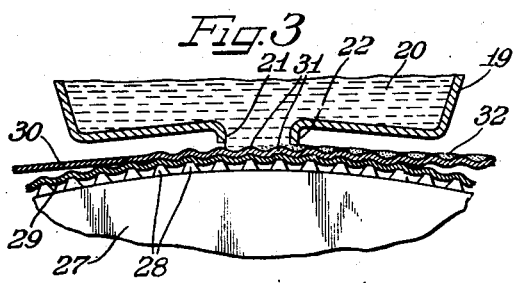
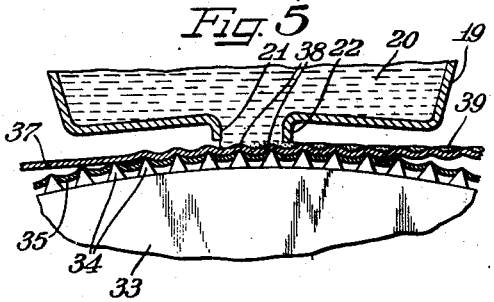
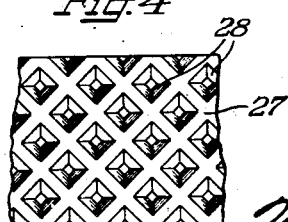
Inventor
Ferdinand Salditt
by The Firm of Charles A. Hill
Attys Patented July 28, 1953

2,646,771

UNITED STATES PATENT OFFICE 2,646,771

APPARATUS FOR MAKING ADHESIVE TAPE

Ferdinand Salditt, Neuwied (Rhine), Germany, assignor to The Scholl Mfg. Co., Inc., Chicago, Ill., a corporation of New York Application April 27, 1950, Serial No. 158,524 In Switzerland May 7, 1949

8 Claims. (Cl. 118—44)

This invention relates to improvements in an apparatus for making adhesive tape, and more particularly to an adhesive tape highly desirable for application to the human body, although it may be used as a masking tape and for other industrial or mechanical purposes if so desired, as will be more apparent to one skilled in the art.

In the past, many and various types of adhesive tape both for medicinal as well as industrial purposes have been developed, but in nearly every instance of which I am aware, such tapes had substantially a uniform layer of adhesive mass upon the tape backing, and were not porous or pervious to air. In many cases, adhesive tape now used for medicinal or surgical purposes is extremely irritating to the skin of some patients, and much of that irritation might be eliminated if the tape were porous or pervious to air and moisture. Some endeavors have already been made to acquire such a tape wherein unporous masses of adhesive were disposed at relatively widely separated points, but such efforts have proven objectionable in that the tape did not adhere to the desired degree, the porosity was usually eliminated when overlapping sections of tape were utilized, and the expense of producing such items was substantially prohibitive. A tape having non-uniform porosity would, of course, eliminate irritation only at the points where there was no adhesive and permit irritation at other points.

With the foregoing in mind, it is an object of this invention to provide apparatus for the manufacture of an adhesive tape that is substantially uniformly porous throughout.

Another object of this invention is the provision of apparatus for making adhesive tape wherein the setting of the adhesive mass is accelerated to such an extent that pores are formed in the mass during the setting thereof.

Still another object of the invention is the provision of apparatus for the making of adhesive tape wherein the adhesive mass is provided on one face of the tape at an elevated temperature, while a cooling medium is contemporaneously applied to the opposite face of the tape to accelerate the setting of the adhesive mass and thus form pores therein.

It is also a feature of this invention to provide apparatus for the making of adhesive tape, wherein a relatively hot adhesive mass is provided against one surface of the tape backing and contemporaneously therewith a cooling liquid is applied to the opposite face of the tape backing so as to both limit the permeation of the tape with the mass, and accelerate the setting of the mass.

Still a further feature of the invention resides in the provision of apparatus for making adhesive tape, wherein a tape backing is continuously moved along a predetermined path, an adhesive mass supplied to one face of that tape backing, while the backing itself is deflected from the flat at numerous points from the opposite face thereof so as to vary the application of the adhesive mass from a true uniform layer.

It is also an object of this invention to provide apparatus for the making of adhesive tape, wherein a single element of the apparatus both wets the tape with a cooling liquid and deviates the surface of the tape from the flat contemporaneously with the application of an adhesive mass to the opposite face of the tape.

While some of the more salient features, characteristics and advantages of the instant invention have been above pointed out, others will become apparent from the following disclosures, taken in conjunction with the accompanying drawing, in which—

Figure 1 is a fragmentary part elevational part sectional view of tape making apparatus embodying principles of the instant invention;

Figure 2 is a fragmentary greatly enlarged vertical sectional view of the upper central portion of the structure of Fig. 1, illustrating the application of the adhesive mass to the tape;

Figure 3 is a fragmentary view similar in character to Fig. 2 but illustrating a somewhat different form of rotary backing member;

Figure 4 is a magnified fragmentary face view of the backing member of Fig. 3; and Figure 5 is a view similar in character to Figs. 2 and 3, but illustrating a still different form of rotary backing member.

As shown on the drawings:

That illustrated embodiment of the instant invention seen in Figs. 1 and 2 includes a main frame 1, and an auxiliary frame 2 adjacent to the main frame. Suitably mounted on an offset portion of the main frame, for free rotation, is a tape supply roll 3. Obviously, the tape carried by the supply or stock roll 3 may be of any desirable width, and is preferably a thin finely woven porous fabric, although it will be understood that both elastic and non-elastic, stretchable or non-stretchable fabric, as well as other materials suitable for the production of plasters and adhesive tapes may be utilized with the present invention. The instant invention is not to be limited by the particular material utilized as the tape backing, although where the tape is used for medicinal or surgical purposes, a finely woven fabric is usually more desirable.

At a higher point on the frame, an adjustable tensioning roll 4 may be provided, and along the bed 5 of the frame a series of guide rolls 6, 7 and 8 may be disposed at desirable points. On the subframe 2, any suitable form of cooling and drying apparatus may be disposed in a housing or tunnel 9. Also carried by the subframe is a suitable tape receiving roll 10. Preferably, the receiving roll 10 is a driven roll, and it may be suitably actuated by means of a prime mover, such as an electric motor 11, by way of a belt or equivalent drive 12.

Suitably journaled in bearing members carried by a cross frame arrangement 13, is a cylinder or drum 14 having a cover 15 of fabric or other suitable material capable of carrying moisture. Mounted beneath the drum 14 is a vat 16 for a quantity of cooling liquid 17, which may satisfactorily be cold water. The drum is also preferably driven from the motor 11 by a suitable belt 18 or equivalent drive element, but rotates in the opposite direction to the aforesaid tape receiving roll 10. In the instance of Fig. 1, the drum 14 rotates clockwise while the tape receiving roll 10 rotates counterclockwise.

Mounted above the bed 5 of the main frame 1 is a suitable hopper 19 from which an adhesive mass 20 may be dispensed through an opening 21 at the bottom of the hopper. It will be noted, especially from the showing in Figs. 2, 3 and 5, that the trailing side of the discharge opening 21 is defined by a downwardly turned portion of the bottom forming a doctor blade 22 which, assures an even spread of the adhesive mass 20 on the tape. A sealed-in electrical heating element 23 is preferably positioned inside the hopper 19 in order to maintain the adhesive mass at a desired elevated temperature, and this heating unit may be connected by conductors 24 to any suitable source of electrical energy.

A satisfactory adhesive mass may consist of a relatively high molecular weight organic polymer dissolved in a liquid polymer of a lower degree of polymerization, hence having a lower molecular weight. For example, the adhesive mass may be prepared by dissolving a normally solid poly vinyl alkyl ester in a liquid or liquefied poly vinyl alkyl ester of a lower degree of polymerization. In such case, adhesive and rubber-like or semi-elastic properties of the highly polymerized component are permanently conserved in the solution in the lower molecular weight polymer. Such a substance is more fully described, set forth, and claimed in my copending application for patent entitled Adhesive Substance for Plaster Coating and Method of Making the Same, filed of even date herewith, Serial No. 158,605; and the process herein described for the fabrication of an adhesive tape from such materials and the adhesive tape resulting therefrom are described and claimed in my copending application Serial No. 240,333, filed August 4, 1951.

In operation, a strip of tape backing 25 is preferably drawn from the supply roll 3 and passes over the tension roll 4, the guide rolls 6, 7 and 8, and any guide rolls that may be contained in the tunnel 9, all such tension and guide rolls being preferably idlers, and the movement of the tape being caused by pull from the driven receiving roll 10 and a feeding movement imparted by the drum 14. From the showing in Figs. 1 and 2, it will be noted that the drum preferably projects above the line between the adjacent guide rolls 7 and 8 so that the drum causes an elevation in the tape directly opposite the opening 21 in the adhesive supply hopper so that the drum may form a suitable backing for the application of the adhesive to the top surface of the tape.

Now with reference to Fig. 2, it will be seen that as the tape continuously moves along its predetermined path, the adhesive mass 20 which is preferably at a temperature in the neighborhood of 110° C. will be deposited on the upper face of the tape 25 through the opening 21. The doctor blade 22 will insure an even application of the adhesive so that a substantially uniform film 26 remains on the tape. Contemporaneously with the application of the adhesive to the upper face of the tape, a cooling fluid is applied to the opposite face of the tape. In the illustrated instance, this cooling fluid, of course, is cold water 17 from the vat 16 which is carried up against the tape by the cover 15 of the drum. The application of the cooling medium to the opposite side of the tape causes almost an instantaneous initial setting of the film 26 which may satisfactorily be approximately 0.2 mm. thick. This initial setting of the adhesive film 26 is sufficiently rapid to cause the formation of a myriad of fine pores in the film itself due to the very sudden contraction thereof, thus rendering the tape porous or permeable to both air and liquid. The finished tape is then wound upon the receiving spool 10, and the adhesive surface remaining thereon is preferably of the pressure sensitive variety, that is the type that adheres upon application without previous wetting.

It will also be noted that the application of the cooling liquid to the bottom face of the tape limits the penetration of the tape by the adhesive mass so that this mass will not penetrate more than slightly into the tape. Also, by virtue of the cover 15 on the drum and the thin film of liquid created at the point of contact of this cover with the tape, the drum will tend to feed the tape along its predetermined path, thus maintaining the desired steady movement of the tape at the point of application of the adhesive mass.

With the above described apparatus, and in accordance with the method apparent in the foregoing description, a thin easily usable tape is provided. The porosity of the tape eliminates to a considerable degree irritation of the skin of a user, and the porosity is substantially uniform throughout the tape, the myriad of pores provided in the adhesive substance by virtue of the sudden chilling thereof are substantially microscopic in character and distributed throughout the layer of adhesive. At the same time, the tape possesses great adhering power.

It makes no difference whether the tape is elastic or stretchable, or otherwise. However, in Figs. 3 and 4 I have illustrated a form of apparatus highly desirable for the application of the adhesive mass to an elastic or stretchable tape. In this instance, a drum 27 is utilized having numerous pyramidal-like projections 28 on the surface thereof, these projections preferably terminating in miniature flat tops, rather than sharp points, as is clearly seen in Fig. 4. The moisture absorbent cover 29 around the drum, as seen in Fig. 3, is placed on the drum with sufficient tightness as to be depressed in between the projections 28.

Thus, with an elastic or stretchable tape 30 passing over the drum, the elastic tape will also be provided with numerous elevations 31 in the vicinity of the hopper opening 21, and consequently the application of the adhesive film 32 to the tape will not be uniform in character, but will be thicker between the elevations 31 in the tape than on top of these elevations. Therefore, upon the sudden cooling of the adhesive mass and the rapid initial setting thereof, the thinner regions of the adhesive film will immediately become very porous, and to a greater degree than the part of the film in between the elevations 31, because there will be a slight difference in the rate of initial setting of the thicker portions of the film. A highly porous tape results, and one which has not detracted in any material degree from the elasticity or stretchability of the tape fabric.

Of course, as the tape leaves the region of application of the adhesive film, it will gradually assume its flat character until when wound upon the receiving spool 10, it is again of the same flat condition it was initially, but the character of the adhesive film has not been changed.

In Fig. 5 I have illustrated still another form of drum 33, which is provided with relatively sharp projections 34 in the surface thereof, and in the illustrated instance these projections punch completely through the cover 35 of the drum. Thus, when these projections contact the tape strip 37, the elevations 38 in the tape strip are relatively high so that there is practically no application of adhesive on the elevations, but the adhesive film 39 occurs substantially only between the elevations. Therefore, upon the sudden chilling of the adhesive and the rapid initial setting thereof, pores may be formed in the thicker parts of the adhesive film, but there will be places devoid of adhesive corresponding to the pointed elevations 34 on the drum. Should adhesive be placed on the tape over the elevations, the rapid initial setting of adhesive will withdraw it from the elevations, so that the resultant tape will have porous spots here, and there depending on the arrangement of the elevations, that are utterly devoid of adhesive.

From the foregoing, it will be apparent that with the present apparatus and method, the arrangement of the pores can be controlled to a considerable extent by the arrangement of projections on the drum surface, and the character of those projections. Further, the pore formation can also be regulated by controlling the amount of the adhesive mass deposited on the tape. The thinner the film of adhesive, the greater the number of pores formed therein by the rapid initial setting.

It will be apparent, therefore, that I have provided a novel and economical apparatus and method for the formation of a porous adhesive tape, wherein the pores are provided in the adhesive itself.

It will be understood that modifications and variations may be effected without departing from the scope of the novel concepts of the present invention.

I claim as my invention:

1. In adhesive tape making apparatus, a tape supply spool, an adhesive tape receiving spool, means to move tape from the supply spool to the receiving spool along a predetermined path, a hopper to deposit an adhesive mass on a face of said tape during its travel, a vat for cooling liquid adjacent the path of the tape, and a rotary drum having an absorbent surface positioned to pick up liquid from said vat and bear against the tape opposite the point of application of the adhesive mass.

2. In adhesive tape making apparatus, means to move a strip of tape continuously along a path, a rotary drum adjacent said path and bearing against one face of the tape to aid the movement of the tape, an absorbent cover trained about said drum and traveling therewith, means for cooling said tape associated with said cover to apply a cooling fluid against the cover, and adhesive supply means positioned to deliver an adhesive mass to the opposite face of the tape at a relatively high temperature.

3. In adhesive tape making apparatus, means to move a strip of tape continuously along a path, a rotary drum adjacent said path and bearing against one face of the tape to aid the movement of the tape, an absorbent cover on said drum, a vat for a cooling liquid in which said drum rotates, and means to deliver relatively hot adhesive to the opposite face of the tape.

4. In adhesive tape making apparatus, means to move a strip of tape continuously along a path, a rotary drum adjacent said path and bearing against one face of the tape to aid the movement of the tape, outwardly extending pyramid-like projections on the surface of said drum, an absorbent cover over said drum and projections, a vat for a cooling medium in which said drum rotates, and means for applying an adhesive film to the opposite face of the tape at a relatively high temperature, said projections causing a variation in thickness of the adhesive film.

5. In adhesive tape making apparatus, means to move a strip of tape continuously along a path, a rotary drum adjacent said path and bearing against one face of the tape to aid the movement of the tape, outwardly extending sharp-pointed projections on said drum, an absorbent cover on said drum pierced by said projections, a vat for a cooling liquid in which said drum rotates, and means for applying an adhesive film to the opposite face of the tape, said projections limiting the application of the film to the spaces between the apices of said projections.

6. In adhesive tape making apparatus, means to move a strip of tape continuously along a path, a rotary drum adjacent said path and bearing against one face of the tape to aid the movement of the tape, an absorbent cover for the drum, means associated with said drum cover to apply a cooling fluid against the tape, adhesive supply means positioned to deliver an adhesive mass to the opposite face of the tape at a relatively high temperature, said supply means including a hopper having a discharge opening in the bottom thereof, and the trailing side of said opening depending to form a doctor blade.

7. In adhesive tape making apparatus, means to move a strip of tape continuously along a path, a rotary drum adjacent said path and bearing against one face of the tape to aid the movement of the tape, a vat for a cooling liquid, an absorbent cover trained about said drum and traveling therewith and passing through the cooling liquid in said vat, and means to deliver relatively hot adhesive to the opposite face of the tape.

8. In adhesive tape making apparatus, means to move a strip of tape continuously along a path, a rotary drum adjacent said path and bearing against one face of the tape to aid the movement of the tape, a vat for a cooling liquid, an endless absorbent cover, said drum and said vat being adapted to effect travel of the endless absorbent cover trained about said drum and passing through the liquid in said vat, and means to deliver relatively hot adhesive to the opposite face of the tape.

FERDINAND SALDITT.

References Cited in the file of this patent

UNITED STATES PATENTS

| Number | Name | Date |
|---|---|---|
| 449,670 | Denney | Apr. 7, 1891 |
| 1,027,144 | Neely | May 20, 1912 |
| 1,604,491 | Hofmann | Oct. 26, 1926 |
| 2,054,115 | Abrams et al. | Sept. 15, 1936 |
| 2,114,393 | Lane | Apr. 19, 1938 |
| 2,170,140 | Grupe | Apr. 22, 1939 |
| 2,342,969 | Richardson et al. | Feb. 29, 1944 |
| 2,363,805 | Roberts | Nov. 28, 1944 |
| 2,542,819 | Kropa | Feb. 21, 1951 |